(12) United States Patent
Bertsch (10) Patent No.: US 10,946,352 B2
(45) Date of Patent: *Mar. 16, 2021

(54) BLENDER SYSTEM

(71) Applicant: Jooster IP AG, Bielbenken (CH)

(72) Inventor: Christoph Bertsch, Pacific Palisades, CA (US)

(73) Assignee: VEJO IP AG, BielBenken (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,483

(22) Filed: Dec. 6, 2019

(65) Prior Publication Data

US 2020/0114321 A1    Apr. 16, 2020

Related U.S. Application Data

(60) Continuation of application No. 16/576,600, filed on Sep. 19, 2019, which is a continuation of application
(Continued)

(51) Int. Cl.
*B01F 13/00*    (2006.01)
*A47J 43/042*    (2006.01)
(Continued)

(52) U.S. Cl.
CPC ........... *B01F 13/002* (2013.01); *A47J 43/042* (2013.01); *B01F 7/162* (2013.01);
(Continued)

(58) Field of Classification Search
CPC ............... B01F 13/002; B01F 15/0087; B01F 15/00519; B01F 7/162; B01F 15/0224;
(Continued)

(56) References Cited

U.S. PATENT DOCUMENTS 3,347,410 A * 10/1967 Schwartzman .... B65D 51/2835
222/80
3,349,966 A * 10/1967 Schwartzman ...... B65D 47/248
222/80
(Continued)

FOREIGN PATENT DOCUMENTS

DE    10 2016 005983    11/2017
EP    2 311 748 A1    4/2011
WO    2015/148183 A1    10/2015

OTHER PUBLICATIONS

"NutriBullet 600 Nutrient Extractor & Hi-Speed Blender." NutriLiving by NutriBullet. Dec. 3, 2018. Accessed Dec. 6, 2018. https://www.nutriliving.com/shop/nutribullet.
(Continued)

*Primary Examiner* — Charles Cooley
(74) *Attorney, Agent, or Firm* — SoCal IP Law Group LLP; Guy Cumberbatch; Steven C. Sereboff (57) ABSTRACT

A blender for blending ingredients from a container with a fluid includes a bottle including a chamber with an opening to receive the fluid and a shoulder about the opening. The blender further includes a lid configured to couple with the bottle that includes a container receiver. The container receiver is configured to receive the container containing the ingredients and position the container against the shoulder when the lid is coupled to the bottle, wherein the shoulder is configured to have a shape and size to receive and seat the container. The container receiver is further configured to apply pressure to the container while the shoulder holds the container stationary to discharge the ingredients from the container into the chamber.

21 Claims, 10 Drawing Sheets

Related U.S. Application Data

No. 16/216,343, filed on Dec. 11, 2018, now Pat. No. 10,427,119, which is a division of application No. 16/107,787, filed on Aug. 21, 2018, now Pat. No. 10,399,050.

(51) Int. Cl.

| | | |
|---|---|---|
| *B01F 7/16* | (2006.01) | |
| *B65D 81/32* | (2006.01) | |
| *B65D 77/20* | (2006.01) | |
| *B65D 47/04* | (2006.01) | |
| *B65D 83/00* | (2006.01) | |
| *B65D 51/18* | (2006.01) | |
| *B01F 15/00* | (2006.01) | |

(52) U.S. Cl.
CPC ...... *B01F 13/0022* (2013.01); *B01F 15/0087* (2013.01); *B01F 15/00519* (2013.01); *B65D 47/046* (2013.01); *B65D 51/185* (2013.01); *B65D 77/2024* (2013.01); *B65D 81/3222* (2013.01); *B65D 83/0094* (2013.01); *B65D 2251/0031* (2013.01); *B65D 2251/0087* (2013.01)

(58) Field of Classification Search
CPC .. B01F 13/0033; B01F 13/0022; B65D 81/32; B65D 77/2024; B65D 47/046; B65D 83/0094; B65D 2251/0031; B65D 51/185; B65D 81/3222; B65D 2251/0087; A47J 43/042; A47J 43/0716; A47J 43/046
USPC ........................ 206/219–222; 366/130, 153.1
See application file for complete search history.

(56) References Cited

U.S. PATENT DOCUMENTS

| | | | | |
|---|---|---|---|---|
| 3,521,745 A | * | 7/1970 | Schwartzman .... | B65D 81/3211 206/222 |
| 4,362,033 A | * | 12/1982 | Young ............... | B01F 15/00155 222/56 |
| 4,487,509 A | * | 12/1984 | Boyce ................. | A47J 43/046 366/199 |
| 5,170,888 A | * | 12/1992 | Goncalves ......... | B65D 81/3211 206/222 |
| 5,425,579 A | * | 6/1995 | Sampson ............ | B01F 7/162 366/130 |
| 5,797,313 A | * | 8/1998 | Rothley .............. | A47J 31/402 222/129.4 |
| 6,132,078 A | * | 10/2000 | Lin .................... | B24B 37/04 366/136 |
| 6,962,432 B2 | * | 11/2005 | Hofeldt .............. | A47J 43/042 215/309 |
| 7,025,200 B2 | * | 4/2006 | Fontana ............. | A61J 1/2093 206/222 |
| 7,364,348 B1 | * | 4/2008 | Jones ................. | A47J 43/042 366/130 |
| 7,371,004 B1 | * | 5/2008 | Branson, III ...... | A47J 43/046 366/130 |
| 7,870,952 B2 | * | 1/2011 | Fontana ............. | B65D 81/3222 206/222 |
| 8,403,131 B2 | | 3/2013 | Rovelli | |
| 8,684,231 B2 | | 4/2014 | Lane et al. | |
| 8,851,739 B2 | * | 10/2014 | Gonzalez ........... | A47J 43/046 366/130 |
| 9,132,950 B1 | * | 9/2015 | Anderson .......... | B65D 81/32 |
| 9,504,974 B2 | | 11/2016 | Ochoa et al. | |
| 9,717,264 B2 | | 8/2017 | Herbert | |
| 9,775,454 B2 | * | 10/2017 | Gonzalez ........... | A61J 9/0623 |
| 9,883,766 B2 | | 2/2018 | Nachawati | |
| 9,932,217 B2 | | 4/2018 | Perrelli et al. | |
| D852,589 S | | 7/2019 | Bertsch | |
| 10,399,050 B1 | * | 9/2019 | Bertsch ............... | B01F 7/162 |
| 10,427,119 B1 | * | 10/2019 | Bertsch ............... | B65D 83/0094 |
| 10,532,866 B2 | | 1/2020 | Teague | |
| 10,792,630 B1 | * | 10/2020 | Pamplin ............. | A47J 43/0716 |
| 10,799,071 B2 | * | 10/2020 | Pamplin ............. | A47J 43/075 |
| 2005/0167296 A1 | * | 8/2005 | Shenkar ............. | B65D 81/3222 206/219 |
| 2006/0198241 A1 | * | 9/2006 | Krishnachaitanya ........................ | A47J 43/046 366/205 |
| 2008/0290061 A1 | | 11/2008 | Seelhofer | |
| 2010/0025268 A1 | * | 2/2010 | Lee ..................... | B65D 25/082 206/221 |
| 2010/0185322 A1 | * | 7/2010 | Bylsma .............. | A61M 5/1413 700/239 |
| 2011/0166910 A1 | * | 7/2011 | Marina .............. | B65D 81/3261 705/7.29 |
| 2015/0374175 A1 | * | 12/2015 | Garr ................... | A47J 43/27 366/130 |
| 2016/0159632 A1 | | 6/2016 | Wheatley et al. | |
| 2017/0101252 A1 | | 4/2017 | Acott | |
| 2017/0129665 A1 | | 5/2017 | Rolfes | |
| 2017/0156540 A1 | | 6/2017 | Wheatley et al. | |
| 2017/0280745 A1 | | 10/2017 | Herbert et al. | |
| 2020/0390286 A1 | * | 12/2020 | Pamplin ............. | A47J 43/0716 |

OTHER PUBLICATIONS

"Single-Serve Blender with Travel Lid." Infographic: Fast Facts on Coffee Consumption—HamiltonBeach.com. Accessed Dec. 6, 2018. https://www.hamiltonbeach.com/single-serve-blender-with-travel-lid-51101b.
"Portable Blender USB Juicer Cup" Amazon. Accessed Dec. 6, 2018. https://www.amazon.com/Portable-Blender-USB-Juicer-Cup/dp/B0718XXVBR.
"KUWAN Mini Electric Fruit Juicer Rechargeable Portable Blender with USB Charging Cable." Amazon. Accessed Dec. 6, 2018. https://www.amazon.com/KUWAN-Electric-Rechargeable-portable-protection/dp/B071ZVQSP5.
"Buy Predator Nutrition Mixer Bottle | Blender/Shaker in One." Predator Nutrition. Oct. 15, 2018. Accessed Dec. 6, 2018. https://www.predatomutrition.com/shakers-bottles-mixers/predator-nutrition/mako-vortex-mixer.html.
"PODlife—Quality Protein Powders in Biodegradable PODs." Kickstarter. Accessed Dec. 6, 2018. https://www.kickstarter.com/projects/podlife/podlife-protein-in-pods.
"LifeFuels—Personalized Drinks, on the Go" LifeFuels—Personalized Drinks, on the Go. Accessed Dec. 6, 2018. https://www.lifefuels.co/.
Drinkfinity. "A New Drink for Every You, by Mixing Water with Simply Great Ingredients." Drinkfinity. Accessed Dec. 6, 2018. https://www.drinkfinity.com/.
European Patent Office, International Search Report for PCT Application No. PCT PCT/1B2019/056985, dated Dec. 12, 2019. 5 pages.
European Patent Office, Written Opinion for PCT Application No. PCT PCT/162019/056985, dated Dec. 12, 2019. 5 pages.

* cited by examiner

BLENDER SYSTEM

CROSS-REFERENCE TO RELATED APPLICATION

This application is a continuation of U.S. patent application Ser. No. 16/576,600, filed Sep. 19, 2019, entitled "PODS FOR BLENDER SYSTEM"; which is a continuation of U.S. patent application Ser. No. 16/216,343, filed Dec. 11, 2018, now U.S. Pat. No. 10,427,119, issued Oct. 1, 2019, entitled "BEVERAGE BLENDER SYSTEM"; which is a divisional application of U.S. patent application Ser. No. 16/107,787, filed Aug. 21, 2018, now U.S. Pat. No. 10,399,050, issued Sep. 3, 2019, entitled "BEVERAGE BLENDER SYSTEM", the contents of each of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates generally to portable blenders.

Description of the Related Art

Different types of available stationary and portable blenders allow consumers to blend whole fruits, vegetables, nuts, seeds, milks and other ingredients to create nutrition smoothies. However, the process of buying and preparing these ingredients can be inconvenient and costly. Existing portable blenders still require bulky and messy ingredients to be purchased, carried, and prepared to blend a smoothie. A portable blender that can be used to conveniently make nutrition smoothies and other foods is desirable.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

A portable blender that uses a container (e.g., pod) to easily and conveniently make a smoothly blended beverage or food (hereinafter referred to as a "smoothie") is disclosed herein. The containers contain nutrients, such as powdered fruits and vegetables or other foods, and are convenient for a consumer to transport along with the blender. The container can be placed in the blender and its contents discharged into a blending chamber. The container contents can be blended with a pourable fluid, suspension or mixture, such as water, juice, milk, soy milk, or almond milk, to form a rich, nutrient-dense smoothie. A blending assembly in the blender properly blends the ingredients to eliminate clumps and achieve desired viscosity and aeration, providing a superior product to protein shaker bottles (i.e., bottles with the metal-wire whisk balls for agitation). Power is provided to the blending assembly via a battery.

Figure 1:
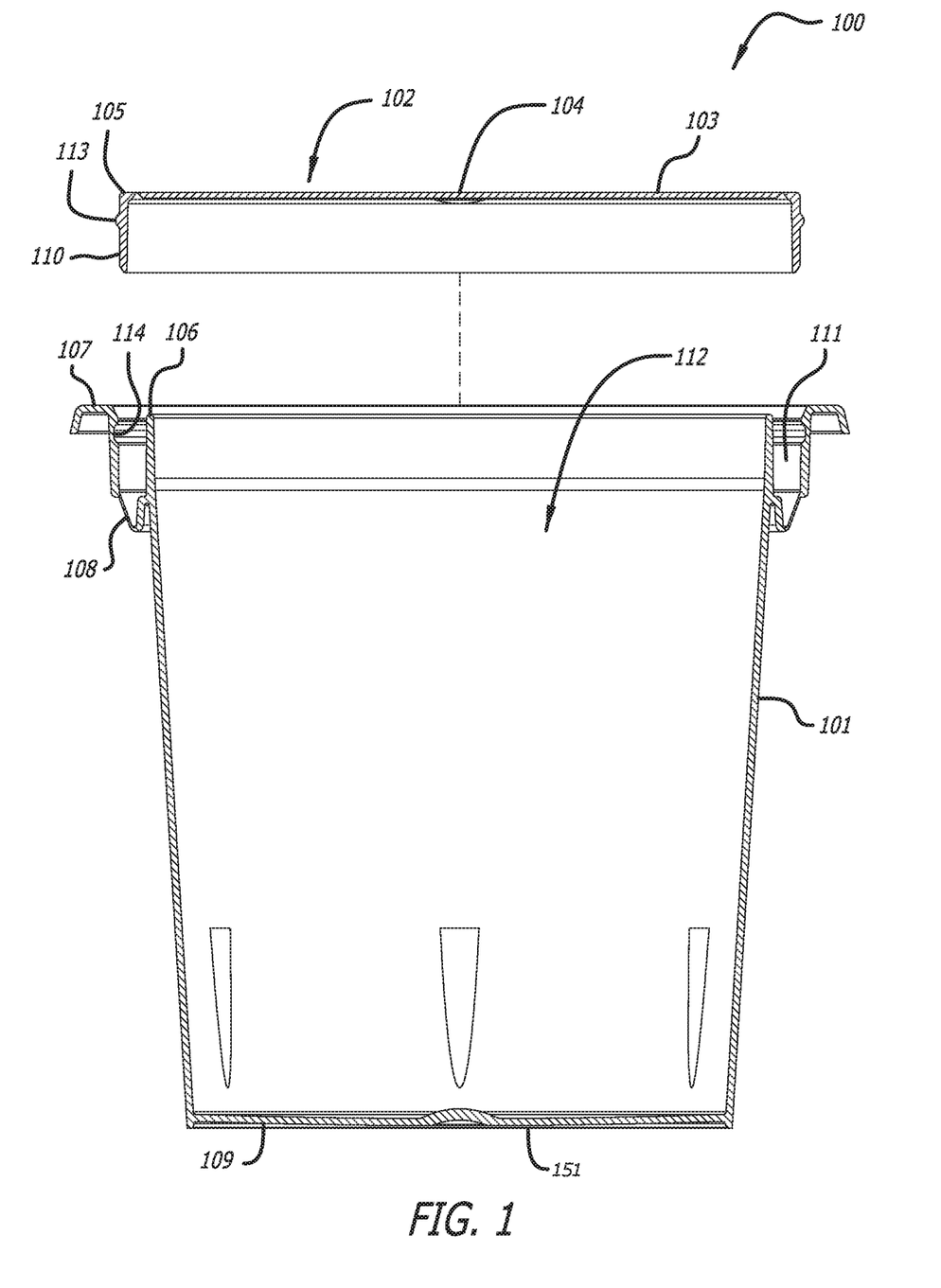
FIG. 1 is an exploded cross-sectional side view of a container in an upright closed position.
Figure 2:
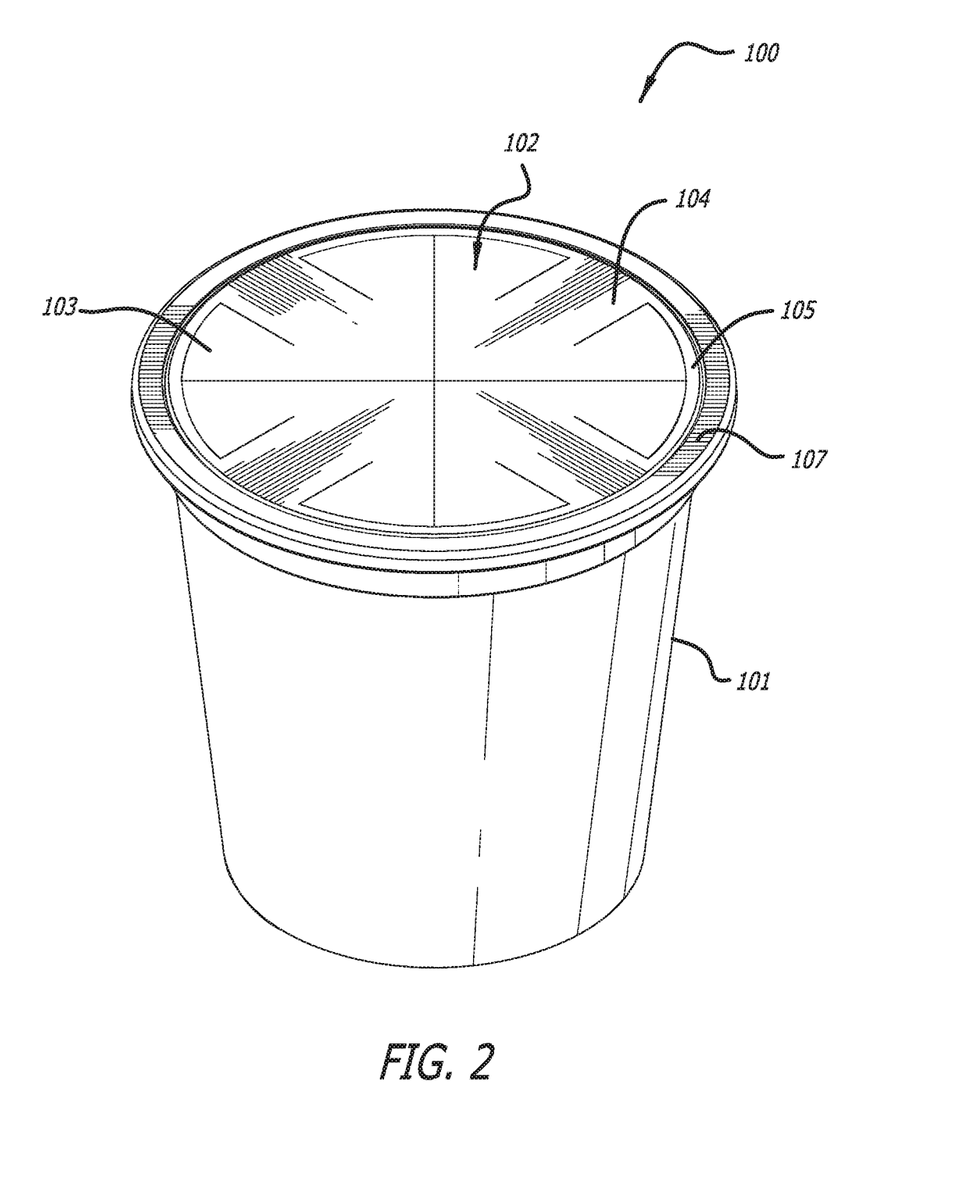
FIG. 2 is a perspective view of the container of FIG. 1 in an upright closed position.
Figure 3:
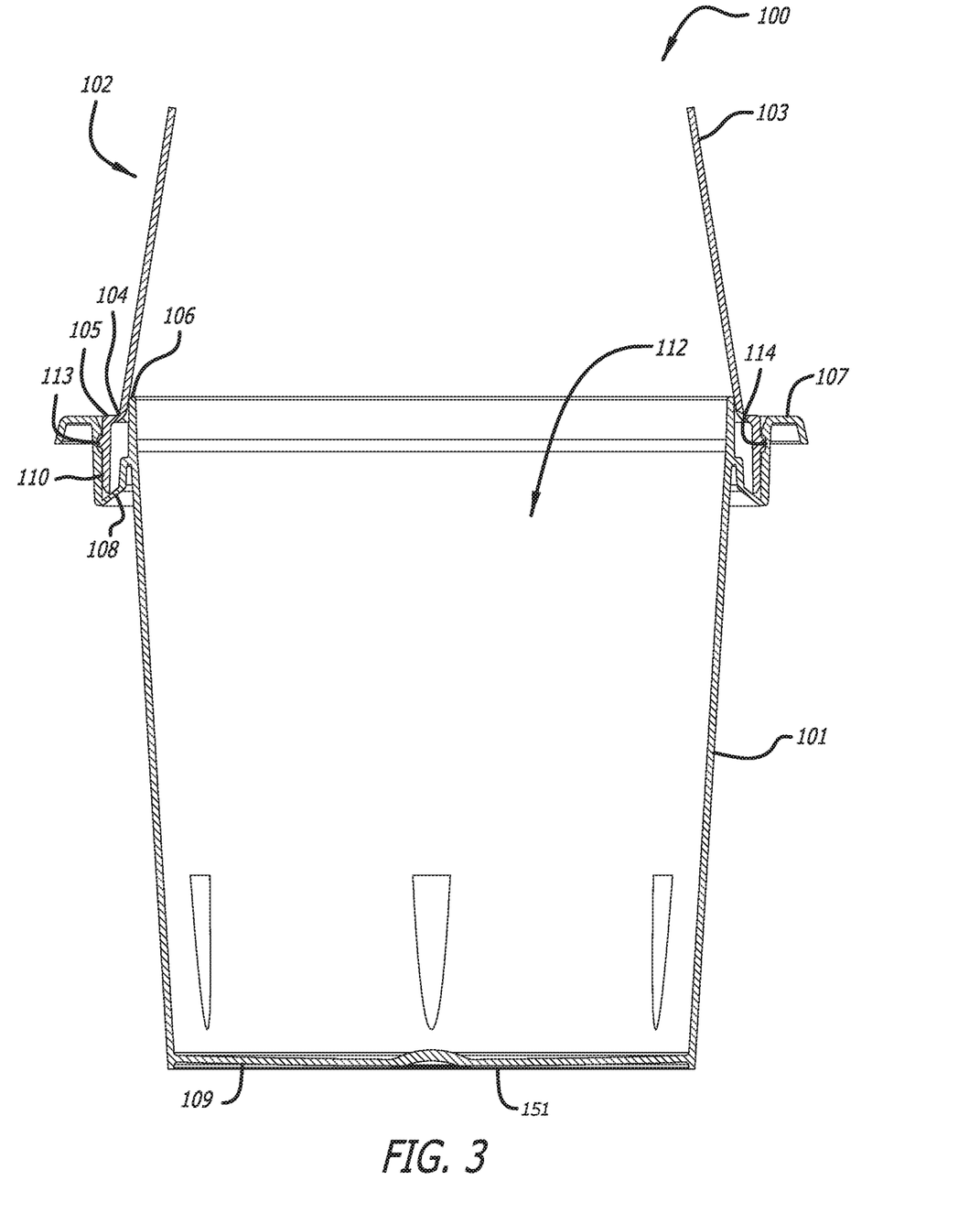
FIG. 3 is a cross-sectional view of the container of FIG. 1 in an upright open position.
Figure 4:
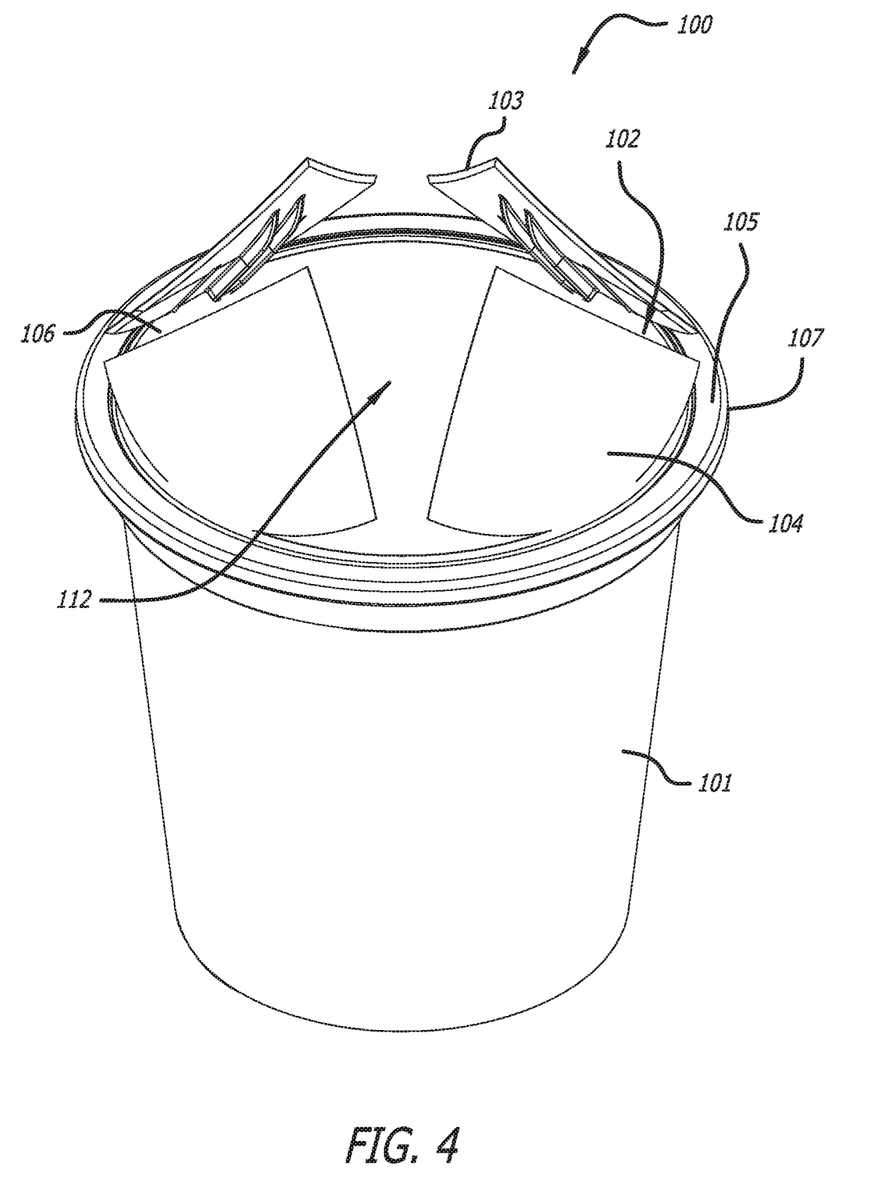
FIG. 4 is a perspective view of the container of FIG. 1 in an upright open position.

Referring now to FIG. 1, an exploded cross-sectional side view of a container 100 in an upright closed position is shown. FIG. 2 is a perspective view of the container 100 of FIG. 1 in an upright closed position, FIG. 3 is a cross-sectional view of the container 100 of FIG. 1 in an upright open position, and FIG. 4 is a perspective view of the container 100 of FIG. 1 in an upright open position. The container 100 has a nutrient receptacle 101 that can receive and hold nutrients. The nutrient receptacle 101 has a closed end 109 and an opening 112 opposite the closed end 109. The nutrient receptacle 101 can have a truncated conical shape (as shown). Other suitable shapes can be cylindrical, cubical, or prismatic shapes with an opening at one end that can receive and hold nutrients.

An inner lip 106 is at a perimeter of the opening 112. An outer lip 107 is positioned outside the inner lip 106 and coupled to the nutrient receptacle 101 at the inner lip 106 via a lip hinge 108, such that a slot 111 is between the outer lip 107 and the inner lip 106. The outer lip 107 may further include a ledge or widening of the outer lip 107 extending away from the opening 112 at an end of the outer lip 107 opposite the closed end 109.

A separate cover 102 includes an apron 110 configured to fit in the slot 111, e.g., via a snap-fit, press-fit, or friction-fit. The apron 110 may include a ridge 113 that is configured to complement a groove 114 on the outer lip 107 in the slot 111 to further fix the cover 102 to the outer lip 107. Alternatively, the apron 110 may include a groove that is configured to complement a ridge on the outer lip 107 in the slot.

A rim 105 is at an edge of the apron 110 opposite the closed end 109. Flaps 103 are broad flat projections that are coupled to the rim 105 via a flap hinge 104, where the flap hinge 104 only extends along a portion of the flap 103. The flaps 103 are positioned to cover the opening 112, where each flap covers a portion of the opening 112. Four flaps 103 are shown, but other suitable numbers of flaps that are shaped and positioned to cover the opening 112 can be used, such as two flaps, three flaps, five flaps, or six flaps.

To prepare the container 100 for consumer use, food ingredients (i.e., nutrients), such as fruits and vegetables, protein, vitamins and minerals, or supplements, are inserted into the nutrient receptacle 101 before the cover 102 is fixed into position. The ingredients may be or include one or more non-food items, such as acidity regulators, anticaking agents, antifoaming agents, antioxidants, bleaching agents, bulking agents, carbonating agents, carriers, colors and color agents, color retention agents, emulsifiers, emulsifying salts, firming agents, flavor enhancers, flour treatment agents, foaming agents, gelling agents, glazing agents, humectants, packaging gasses, preservatives, propellants, raising agents, sequestrants, stabilizers, sweeteners, and thickeners. Ingredients may be whole, chopped or powdered, wet, moist or dry, active or inert.

Once the ingredients are loaded into the nutrient receptacle 101, the cover 102 is positioned on the nutrient receptacle 101 so that the apron 110 slides into the slot 111 until the rim 105 is substantially flush with the outer lip 107 when the cover 102 is fixed to the nutrient receptacle 101, as shown in FIG. 2. In this closed position, the flaps 103 cover the opening 112 and the nutrients are held in the closed container 100.

The contents can be released from the closed container 100 for use and consumption. The flaps 103 are pushed open and away from the nutrient receptacle 101, as shown in FIGS. 3 and 4, by the inner lip 106 when the outer lip 107 and the rim 105 are pressed towards the closed end 109. The lip hinge 108 allows the outer lip 107 to move or "collapse" with respect to inner lip 106. The collapsing outer lip 107 pushes the rim 105 towards the closed end 109. As the rim 105 moves towards the closed end 109, the inner lip 106 presses the against the flaps 103, which then rotate on their respective flap hinges 104 open and away from the nutrient receptacle 101. With the flaps 103 open, the nutrient content can be discharged from the container 100 through the opening 112. The container 100 should reliably discharge its contents without powder clinging, sticking or exploding.

Though a particular configuration of the container 100 has been described above, the container can have various other configurations. The container can have four flaps, two flaps, or other flap count variations. The container can have ribs for additional structural support. The flaps can be hingedly attached to the outer lip. The flaps can overlap or be coupled to each other with a membrane. The container can be constructed of only one piece or of multiple pieces. The container can include an inner knife mechanism, where pressure on the closed end of the nutrient receptacle causes the inner knife mechanism to push the flaps out or puncture a seal to allow the nutrient content to be discharged from the container. The closed end can be deformable from one configuration (e.g., convex) to another configuration (e.g., concave) to further aid in the discharging of the nutrient content.

The container can be formed of any suitable material, such as plastic, metal, compostable materials, waxed paperboard, bioplastic, etc.

Figure 5:
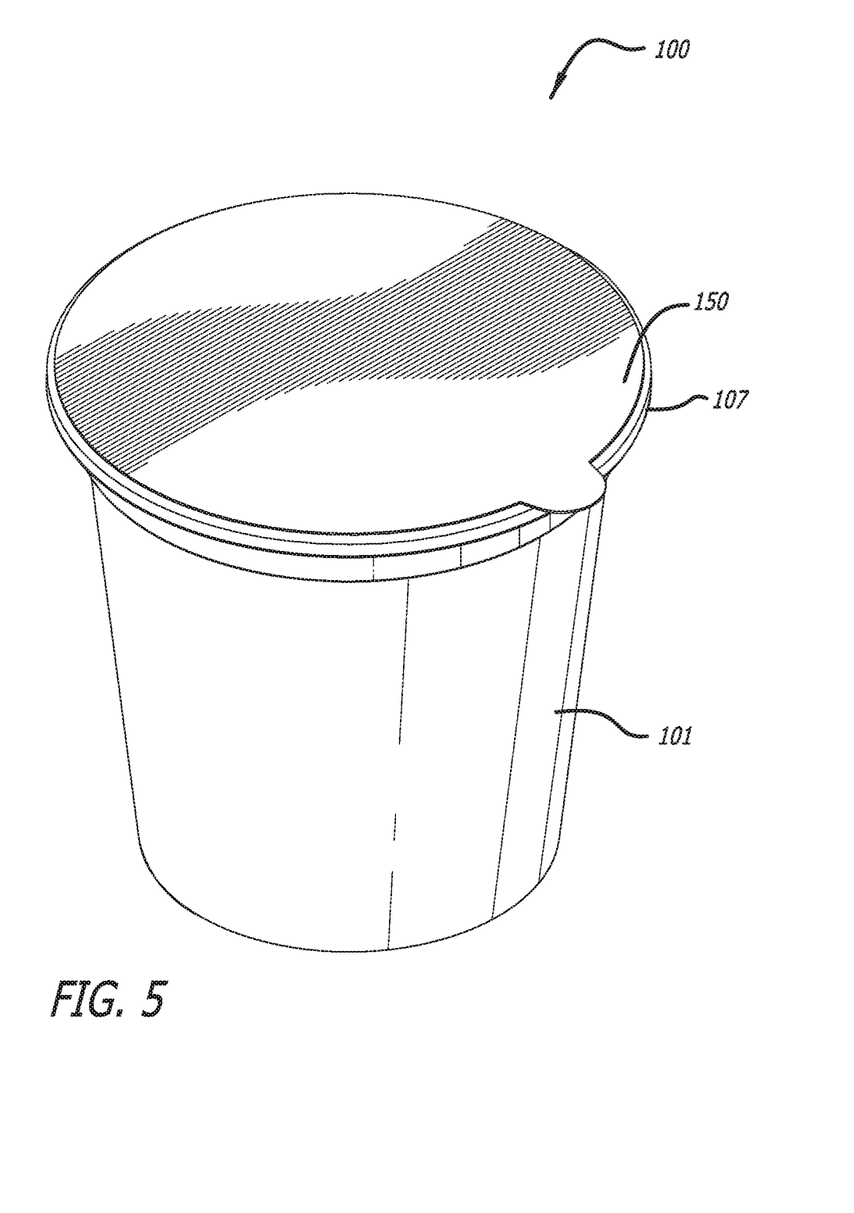
FIG. 5 is a perspective view of the container of FIG. 1 in an upright closed position with a seal.

The container 100 can also be sealed, which may prevent damage to the contents from humidity and contamination, lock in freshness (e.g., so that the contents do not clump or become hard) and otherwise secure and protect the contents. FIG. 5 is a perspective view of the container of FIG. 1 in an upright closed position with a seal 150. The seal 150 can be placed over the flaps and affixed to the outer lip 107, e.g., via glue or heat sealing, to keep the nutrients from escaping between the flaps 103, the flaps 103 clean, and moisture and other contaminants out. The seal can be paper, plastic, cellophane, and/or foil, or any other suitable material that is durable enough to provide protection and containment for the container 100. The seal can also have a tab, ring, strip, or other graspable part that can facilitate removal of the seal by the consumer. A cover or lid (not shown) can also be used to lock in freshness and protect the seal 150, or be used as a replacement for the seal, and can snap into place about the outer lip 107. The consumer would first need to remove the seal 150 and/or cover to use the container 100.

The container 100 can include identification information 151 to provide various information about the container and its contents, such as a unique identifier for a particular container, manufacture date, authenticity information, nutrient content and/or a blend profile/instructions. The identification information 151 can either be simply printed on the container 100 or on a label affixed to the container 100. Alternatively, the identification information can be stored on the container 100 in the form of a near-field communication (NFC) tag, a printed memory tag, or a barcode. For example, an NFC tag can be affixed to the container 100, such that an NFC reader and antenna, e.g., in the blender, can read the identification information from the container 100 when it is used to make a smoothie. In other examples, a barcode on the container can be read via a barcode reader or a camera in the blender. The identification information can be read when the container is inserted into the blender prior to implementing the blend cycle, during the blend cycle, and/or after the blend cycle. The blender can then use the identification information in a number of ways, including determining whether the container is authentic or counterfeit, and/or fresh or past an expiration date. For example, if the container 100 is expired or counterfeit, then the blender may not actuate the blending assembly. The blender can also implement the blend profile/instructions during blending. The identification information can be read so that it can be stored locally in the blender (e.g., in non-volatile memory) and then passed to cloud storage (i.e., accessible online) via a communication method such as Bluetooth Low Energy (BLE) through a proxy device (e.g., a smart phone or tablet).

Identification information can be based on machine-generated Universally Unique Identifiers ("UUIDs") (i.e., arbitrary alpha-numeric identifiers), or it can be based on well-defined encoding structures that contain one or multiple facts about the container 100. The identification information can be encrypted (e.g., using Advanced Encryption Standard ("AES")) so that decryption is required by the blender. The identification information may contain special characters or encoding structures that indicate that the container 100 is valid. The container may have a digital rights management ("DRM") marking that uses a special ink that reflects a certain wavelength of light (e.g., in response to exposure to infrared light) that can be read to determine authenticity.

Figure 6:
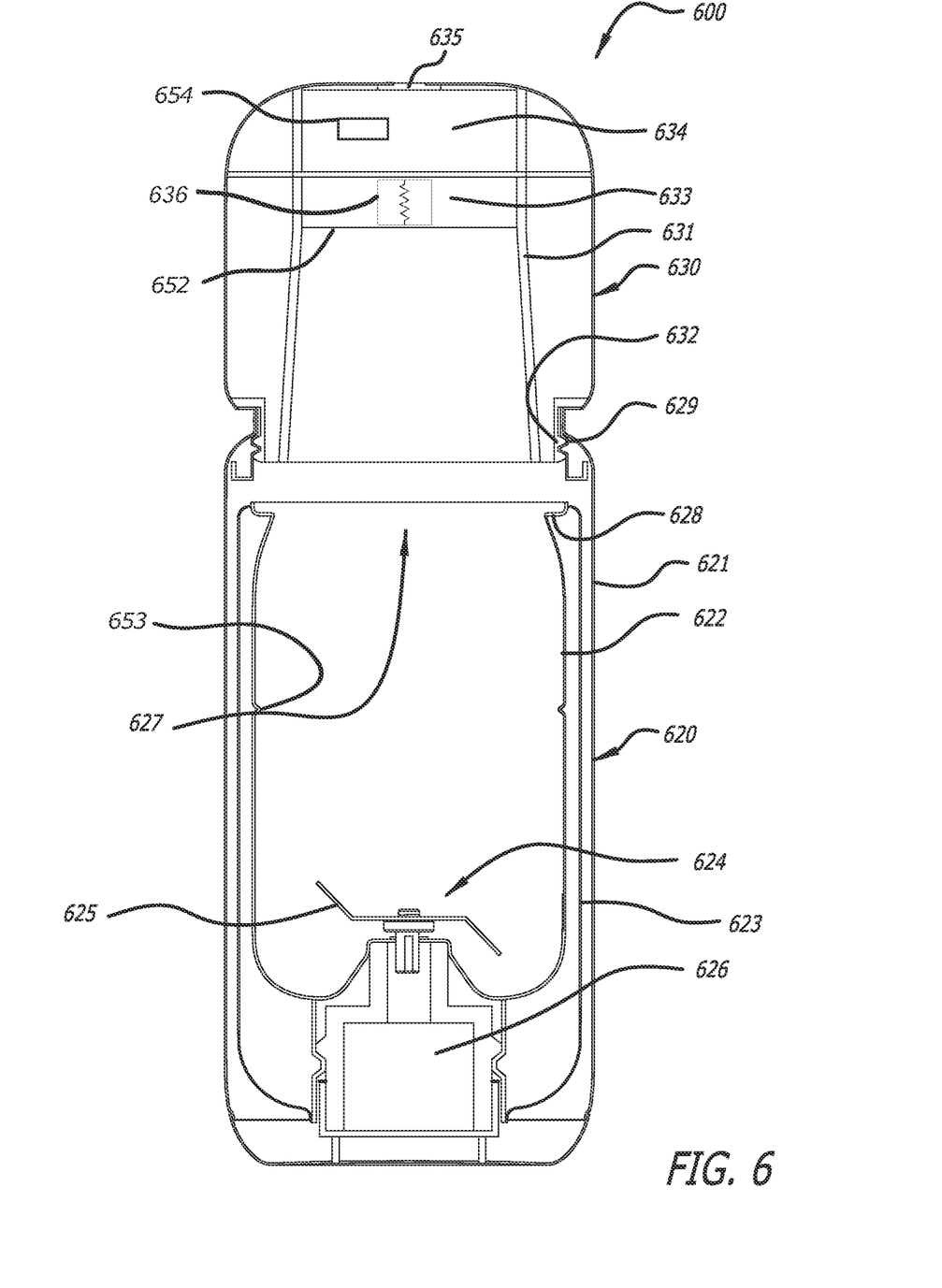
FIG. 6 is a cross-sectional view of a blender in an upright position.
Figure 7:
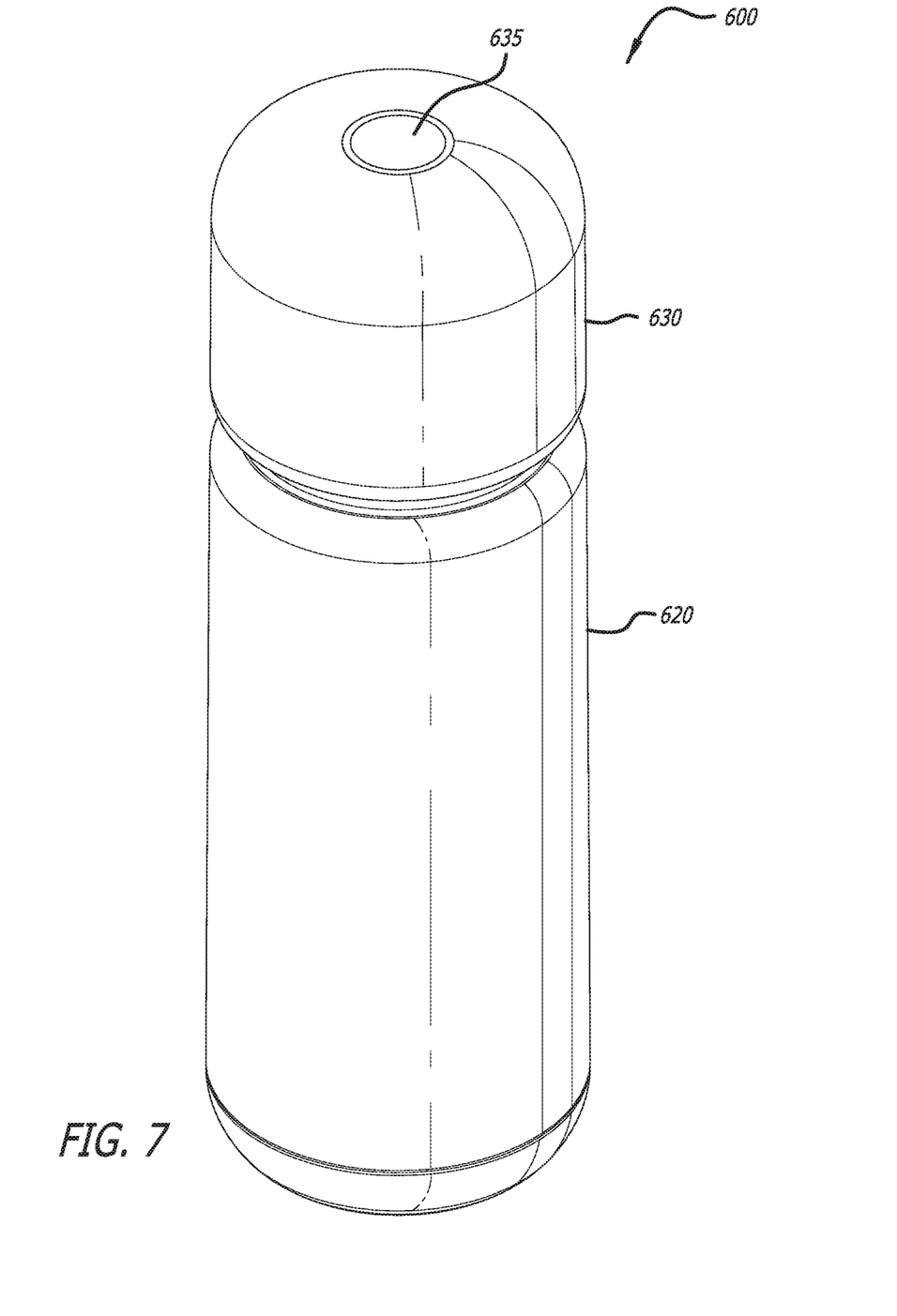
FIG. 7 is a perspective view of the blender of FIG. 6 in an upright position.
Figure 8:
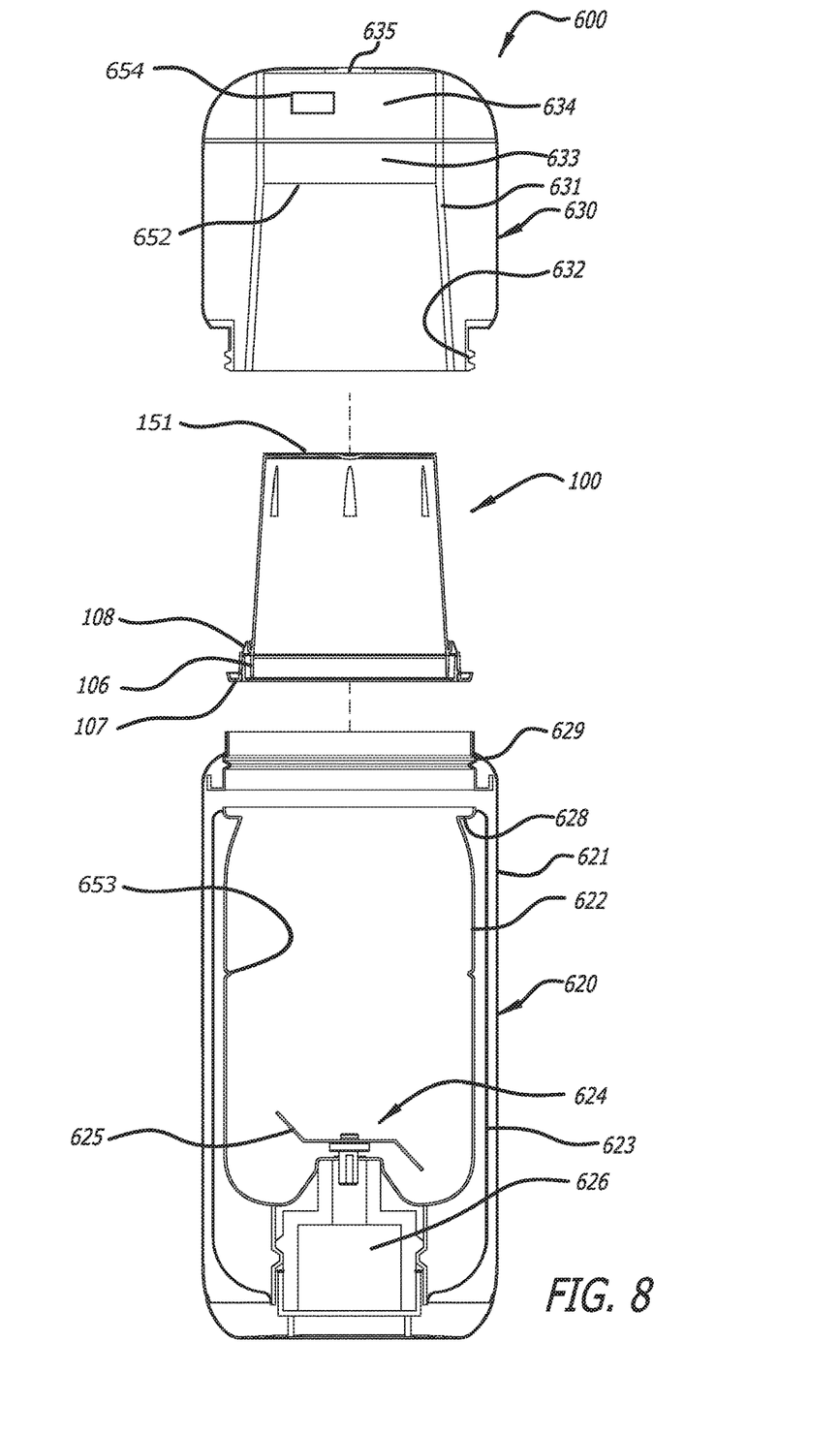
FIG. 8 is an exploded cross-sectional view of the blender of FIG. 6 and the container of FIG. 1.

Referring now to FIG. 6, there is shown a cross-sectional view of a blender 600 in an upright position. FIG. 7 is a perspective view of the blender of FIG. 6 in an upright position, and FIG. 8 is a cross-sectional exploded view of the blender of FIG. 6 and the container of FIG. 1. The blender 600 includes a bottle 620 and a lid 630. The bottle has an exterior 621, a blending chamber 622, an outer wall 623, a blending assembly 624 with at least one blade 625 driven by a motor 626, an opening 627, and a shoulder 628 and a bottle component 629 of a coupling mechanism about the opening 627. The lid 630 has a container receiver 631, a lid component 632 of the coupling mechanism about the container receiver 632, a discharger 633, and electronic devices 634.

The blender 600 can also include a button 635 for controlling its operation. Though the button 635 is shown at the top of the lid 630 in FIG. 6, one or more buttons can be located in any suitable location that is accessible to a consumer, such as the bottom of the bottle 620 or the sides of either the bottle 620 or the lid 630. The button 635 can also be positioned inside the bottle 620 or lid 630 such that it is actuated by closing of the lid. In one example, the button 635 can be actuated by mechanical depression of the button 635 (e.g., when the lid is rotated), which may or may not require the container 100 to be positioned in the blender 600. In other examples, the blender 600 does not have a button, and the blender 600 is actuated electromechanically via a reed switch or hall sensor.

The exterior 621 of the bottle 620 and lid 630 can be formed of one or more of any suitable material that is durable and rigid, such as plastic, rubber, metal, a coated material, wood, foam, etc. The bottle 620 and the lid 630 can be formed of the same material or different materials.

The blending chamber 622 is in the interior of the bottle 620. The blending chamber 622 is suitable for containing a fluid without leaking. The blending chamber 622 can be formed of any suitable material that is durable and rigid, such as metal, plastic, a coated material, glass, etc. The blending chamber includes the shoulder 628 at opening 627 to engage the container 100. The opening 627 allows for fluids and nutrient content to be placed in the blending chamber 622, and for the consumer to remove blended smoothie from the blending chamber 622. The blending chamber 622 can be formed with a double wall construction, where the blending chamber 622 is within an outer wall 623. Air or another insulative material can be positioned between the blending chamber 622 and the outer wall 623, so that the double wall construction can provide an insulating effect to maintain a desired temperature of the fluid and smoothie. The blending chamber 622 can further include a fill line marker to indicate to a consumer how much fluid should be poured into the blending chamber 622.

The blending assembly 624 is mounted in the blending chamber 622. The blending assembly 624 is shown mounted at an end of the blending chamber 622 opposite the opening 627. However, the blending assembly 624 can be mounted in any suitable position within the blending chamber 622 such that desirable blending of the nutrients and fluid is achieved. The blending assembly 624 can have any suitable number of blades 625, such as one blade, two blades, three blades, four blades, etc., with any suitable shape such that desirable blending of the nutrients and fluid is achieved. The blades 625 can be formed of any suitable material that is rigid and durable, such as metal or plastic. The blending assembly 624 is driven by a motor 626. The motor 626 can be any suitable motor that can achieve a torque and RPM such that desirable blending of the nutrients and fluid is achieved, such as brushed, brushless, 2-phase, 3-phase, with an internal controller board, or with no internal controller board. A motor controller (not shown) can be external to the motor or incorporated into the motor.

The blender 600 includes the bottle component 629 and lid component 632 of the coupling mechanism. The bottle component 629 and the lid component 632 together removably couple the bottle 620 and the lid 630. For example, the components 629 and 632 can be complementary threads, a bayonet coupling, complementary slots and posts, or any other suitable type of coupling such that the lid 630 can be removably attached to the bottle 620. For the complementary threads, the threads can be on an exterior surface of the lid 630 and an interior surface of the bottle 620, or the threads can be on an interior surface of the lid 630 and an exterior surface of the bottle 620.

The lid 630 includes a container receiver 631 configured to have a complementary shape to the container 100. The lid 630 optionally may further include a discharger 633 that causes the container 100 to open and its contents to be discharged when the lid 630 is coupled to the bottle 620. In one example, as a result of the lid 630 being coupled to the bottle 620, the discharger 633 presses the container 100 towards the bottle 620 to discharge the nutrient content from the container 100. The discharger 633 can operate in any suitable manner to cause the nutrients to be discharged from the container 100, including via a spring mechanism and/or a screw mechanism. For example, coupling of the lid 630 to the bottle 620 can deploy a spring mechanism in the discharger 633 to press against the closed end 109 of the container 100. In another example, coupling of the lid 630 to the bottle 620 can turn a screw mechanism in the discharger 633 that causes the discharger 633 to press against the closed end 109 of the container 100. In yet another example, the discharger 633 may merely provide a firm fixed surface to apply pressure to the closed end 109 of the container 100.

The blender 600 can also include various other electronic devices 634. For example, the electronic devices 634 can include a battery 654 that powers the blender 600, which could be chargeable via either a traditional wired charger or a wireless inductive charging base. For induction charging, a receiver and coil may be located in the blender 600 and a transmitter may be located in a separate charging pad. Alternatively, the battery can be charged via direct contact, e.g., via a charger with contact-based charger nodes and a charging ring located on the blender 600. In other examples, the battery is replaceable once depleted, or the battery can be recharged using a charging cable that can be plugged into a power source, e.g., via a USB connector or wall plug. The battery can be located in the bottle 620 and/or the lid 630.

The electronic devices 634 can also include communications equipment, such as a Bluetooth transceiver, to transmit and receive information. The Bluetooth transceiver can communicate with other Bluetooth-connected devices, such as computers, tablets, and mobile phones, to receive information, such as customer information, registration information, operating instructions and firmware updates, and to transmit information, such as blender operational status, blender and container usage, including information about nutrition consumed by a user. The information can come from cloud storage or the Internet. The communications equipment can be located in the bottle 620 and/or the lid 630.

The electronic devices 634 can also include sensors for determining whether the lid 630 has been coupled to the bottle 620. The sensors can include hall sensors, reed switches, or any other suitable sensor that can be used to determine whether the lid 630 has been properly attached to the bottle 620 and the blender 600 is ready to be actuated.

The electronic devices 634 can include electrical devices 652 for reading the identification information 151 from the container 100. For example, reading of identification information 151 can be via an NFC tag reader, a camera, a barcode reader, a light-emitting diode (LED) or laser reader, or a printed memory tag reader. In other examples, the electronic devices for reading identification information can be located in the bottle 620 and/or the lid 630. The blender 600 can store the identification information locally in the blender (e.g., in non-volatile memory), and/or transmit the identification information to cloud storage (i.e., accessible online) via a communication method such as Bluetooth Low Energy (BLE) through a proxy device (e.g., a smart phone or tablet). Identification information transmitted to cloud storage can be used for nutrition consumption analysis for users.

The electronic devices 634 can further include a microcontroller unit, memory and firmware that enable control of the blender and storage of information, such as operating the blender (e.g., actuating the blender and controlling blend time and speed), determining freshness of a container based on date/time and container identification information, and controlling indicators regarding operation of the blender. For example, the microcontroller unit can be a single chip that contains a processor, non-volatile memory for a program (read-only memory or flash), volatile memory for input and output (e.g., random-access memory), a clock and an input/output (I/O) control unit. In another example, the memory can be a micro SD card.

To ensure that containers 100 are not reused or refilled, unique identifiers in the identification information can be read and stored locally on the blender 600. When identification information for a particular container is read, the unique identifier is checked against this list and the blender may not operate if the unique identifier is on the list.

The blender 600 can have indicators, including indicator lights and/or sounds, to notify a consumer about the state of the blender 600. For example, different sounds, light colors, or light modulation can indicate different states, such as whether the container 100 is expired or counterfeit, whether the battery level is low or fully charged, whether there is problem with the alignment of the lid 630, whether the blending assembly is stuck, etc. In one example, an indicator light can emit a certain color to indicate a certain state, such as red for a stuck blending assembly, yellow to indicate a low battery, or green to indicate a fully charged battery. In another example, the blender can emit a certain sound to indicate a certain state, such as persistent beeping to indicate a stuck blending assembly or intermittent beeping to indicate a low battery.

The blender 600 may have firmware for tracking and communicating exceptions and unsafe conditions so that the consumer can be notified and/or appropriate responses can be made. The firmware can control indicators for exceptions and unsafe conditions. Indicators for exceptions and unsafe conditions may use a combination of LED color, intensity and pulsing. Exception and unsafe conditions may also be indicated via sounds. In another example, the blender 600 can transmit exceptions and unsafe conditions via a transceiver to a computer, table, or smart phone to alert the consumer. An exception is something that is not normal, but is also not unsafe. For example, "liquid level too low", "counterfeit pod", or "lid not closed" are exceptions. An unsafe condition could cause irreparable harm to the unit, or bodily harm to the consumer. Examples of unsafe conditions include "motor jammed" and "battery overheating". The blender 600 can continuously monitor for exceptions and/or unsafe conditions. In the event of an unsafe condition, the blender will go into "failsafe mode". If a consumer feels that the blender is not functioning properly, the consumer can manually turn it off and "reboot" it using a "panic mode". Both "failsafe mode" and "panic mode" can put the device into "recovery mode".

Exceptions and unsafe conditions can also include: Battery Requires Charging, Device Commissioning, Device Charging (may also be indicated by charging pad), Charging Pad, On Pad and Charging, Not on Pad Properly, Not Charging, Charging Done, Panic Mode, Factory Reset, Device Recovering, Unable to Read Container, Counterfeit Container, Motor Blade Jammed, Overheating, Water Level too Low/Add Water, Container Blending, Done Blending, Firmware Updating, Blender is on its Side (i.e., Bad Angle), Error.

Firmware can be pre-loaded onto the blender 600 during manufacturing. Firmware on the blender 600 may be uploaded later and/or updated, such as in the field. For example, firmware updates can be received wirelessly via BLE, e.g., via a proxy device such as a smart phone or tablet. Alternatively, firmware updates can be received via a wired method, such as USB. In an example, firmware can be stored in cloud storage (i.e., accessible online). Once a consumer is notified or becomes aware that a firmware update is available, the firmware can be updated on the blender. In one example, an over-the-air firmware update can be performed using the smartphone or tablet as a distribution proxy. Here, the update can be delivered to the blender, e.g., via BLE pairing with a smartphone or tablet, or direct connection to the Internet.

The blender 600 can have firmware-managed states for conserving battery power. The blender 600 can go into "sleep mode" after a certain period of inactivity. An accelerometer may be used to detect activity to wake up the blender 600 and put it in "active mode". In another example, coupling of the lid 630 to the bottle 620 can wake up the blender. In yet another example, the blender 600 is woken up when the lid 630 is coupled to the bottle 620, and the blender 600 remains in "active mode" until the lid 630 is removed. In "active mode", the blender 600 detects activity, such as movement, button activation, or container insertion, so that the blender can respond accordingly. In another example, the blender 600 can be delivered to the consumer in "hibernation mode" so that minimal energy is consumed during transportation, distribution, fulfillment, etc. The blender 600 may be taken out of hibernation mode when the consumer first unboxes it and places it on a charging pad or plugs it in.

The blender 600 can have a fluid level sensor 653. For example, the blending chamber can have a capacitive-based fluid level sensor. A rigid-flex circuit design allows sensors to be placed against the inside wall of the blending chamber 622. Alternatively, a digital infrared LED sensor solution can be used to determine fluid level, where the infrared LED and a phototransistor are optically coupled when the sensor is in air and the optical coupling is altered when the sensing tip is immersed in liquid. The blender 600 can use the information from the sensors to determine whether the fluid level in the blending chamber 622 is within acceptable limits. If the fluid level is not within acceptable limits, the blending assembly 624 may not actuate and/or an unacceptable fluid level indicator may be initiated.

In different examples of the blender 600, electronic components can be located in different locations. For example, the microcontroller unit, memory, PCB boards, batteries, charging coils, transceivers, and sensors can be located in either the lid 630 and/or the bottle 620.

In one example, electronic components are located in the lid 630 such that the bottle is dishwasher safe. For induction charging in this example, a wireless charging pad for the lid 630 can be configured to have a shape similar to a container 100. The lid 630 receives the charging pad in a similar manner to reception of the container 100 so that the battery 654 in the lid 630 can be inductively charged via the charging pad. Further, electrical contacts can be positioned on the bottle component 629 and lid component 632 of the coupling mechanism so that electrical power can travel from the battery 654 in the lid 630 to the motor 626 to actuate the blending assembly 624. In one example, at least a portion of the bottle component 629 and the lid component 632 is formed of a non-conductive material (e.g., plastic). The electrical contacts can then be positioned in the non-conductive material of the bottle component 629 and the lid component 632, respectively, so that the electrical contacts align and conduct current when the lid 630 is coupled to the bottle 620. In an example where the coupling mechanism includes threads, the electrical contacts of the bottle component 629 and the lid component 632 are aligned when the lid 630 is rotated to a certain orientation with respect to the bottle 620 during coupling. Further, one or more of the electrical contacts can include a spring to firmly press corresponding electrical contacts against each other and facilitate conduction of electrical power.

The blender 600 is configured to have a size and shape so that a consumer having a typical human hand can manipulate and consume smoothie from the blender. Further, the blender 600 is configured to have a size and shape that is portable, e.g., by hand or in a purse, backpack, or other bag. For example, the blender 600 can have a length of three inches to twelve inches, and a diameter of one inch to six inches. In one example, the blender 600 has a length of about eight inches and a diameter of about three inches. The blender 600 is configured to have weight that allows the blender 600 to be portable and easily manipulated by a typical human hand. For example, the blender 600 can have a weight of 4 ounces to three pounds. In one example, the blender 600 can have a weight of about 8 ounces. In one example, the bottle 620 is heavier than the lid 630 so that the blender is less likely to tip over.

The blender 600 is configured to have a blending chamber 622 with a capacity to make a smoothie having a desirable volume for human consumption. For example, the blending chamber 622 can have a capacity of six fluid ounces to thirty-two fluid ounces. In one example, the blending chamber 622 has a capacity of about ten fluid ounces. The container 100 is configured to have a size with a capacity for nutrients that is complementary to the fluid capacity of the blender, such that a smoothie with a desirable consistency and flavor can be blended. For example, the container 100 can have a capacity from one fluid ounce to eight fluid ounces. In one example where the blender has a capacity of ten fluid ounces, the container 100 may have a capacity of 2 fluid ounces.

Figure 9:
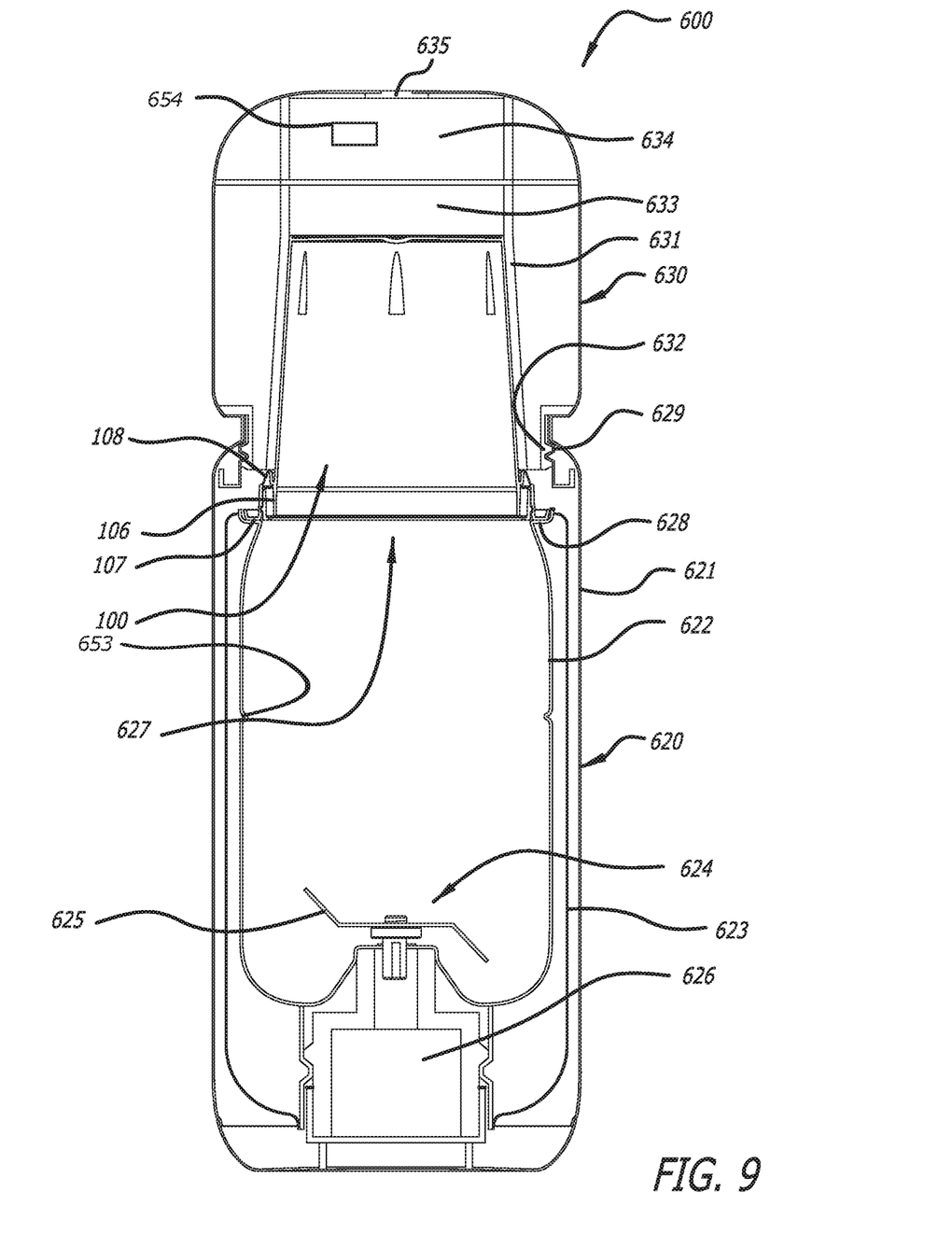
FIG. 9 is a cross-sectional view of the blender of FIG. 6 and the container of FIG. 1.
Figure 10:
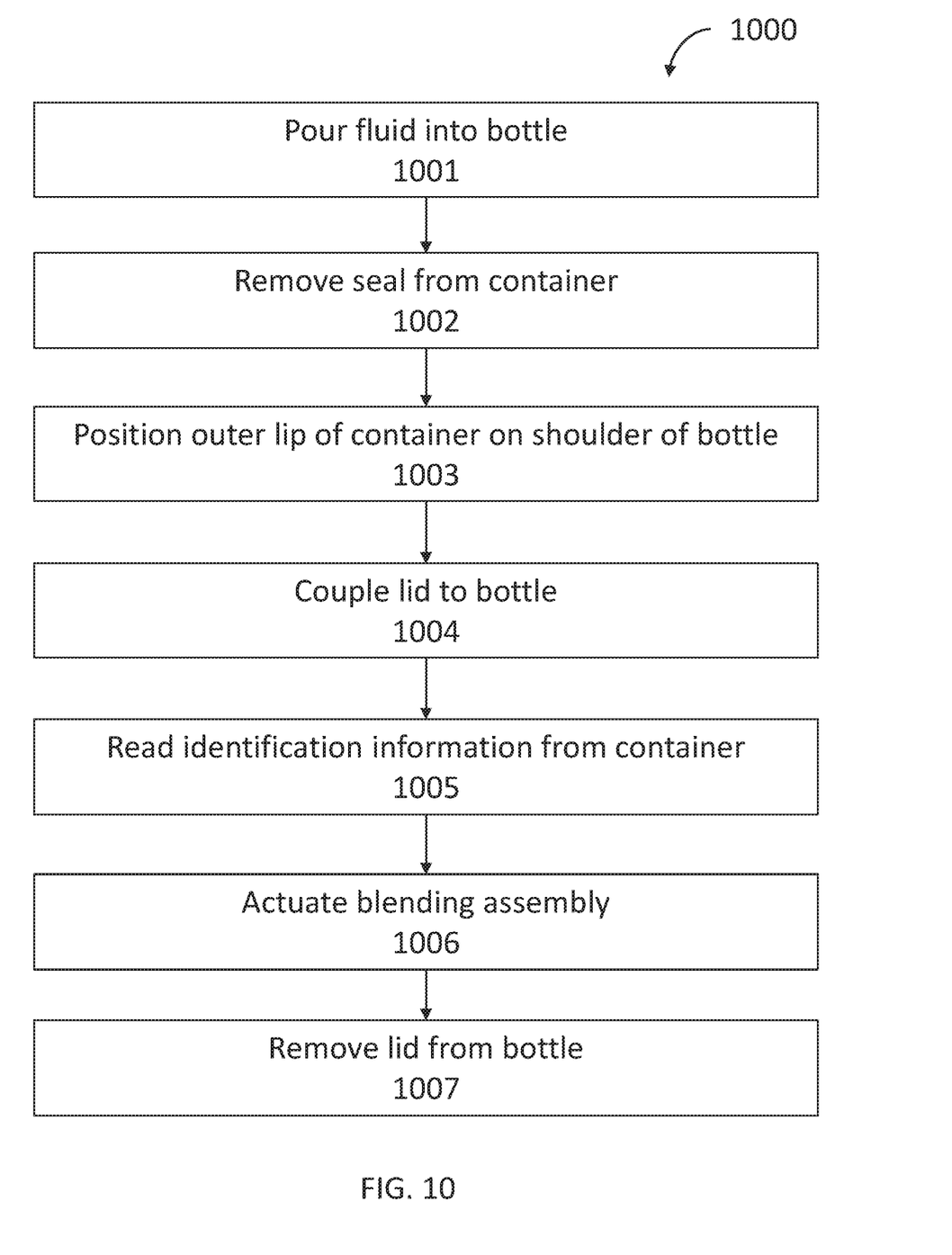
FIG. 10 is a flow chart showing a method of using the blender of FIG. 6 and the container of FIG. 1.

Referring now to FIG. 9, there is shown a cross-sectional view of the blender of FIG. 6 and the container of FIG. 1. Referring also to FIG. 10, there is shown a flow chart of a method 1000 of using the blender of FIG. 6 and the container of FIG. 1 to make a smoothie.

At step 1001, a consumer adds fluid to the blending chamber 622. The consumer can pour in a desired amount of a desired fluid. In one example, the blending chamber 622 includes a fill line to indicate to a consumer how much fluid should be added to the blending chamber 622. While this step of adding fluid to the blending chamber 622 is described first here, fluid can be added to the blending chamber 622 at any point before the blending assembly 624 is actuated.

At step 1002, a consumer prepares the container 100 for use with the blender 600 by first removing any seal 150, cover/lid or other packaging. In one example, the seal can be removed by firmly pulling or peeling the seal from the outer lip 107.

At step 1003, the container 100 is then placed on the bottle 620, so that the outer lip 107 is seated on the shoulder 628. When the outer lip 107 is seated on the shoulder 628, the flaps and inner lip 106 are positioned above the opening 627 of the bottle 620. In one example, the rim 105 is also seated on the shoulder 628 when the container 100 is placed on the bottle 620. In another example, the rim 105 is positioned above the opening 627 when the container 100 is placed on the bottle 620. Alternatively, the container 100 can be placed in the lid 630. In one example, the container 100 can be retained in the lid 630 so that it does not fall out when the lid 630 is right-side up. For example, the container 100 can be retained in the lid 630 by a friction fit, a snap fit between a part of the container 100 and a part of the lid 630, or an adhesive surface.

At step 1004, the lid 630 is then coupled to the bottle 620 via the lid component 629 and the bottle component 629 of the coupling mechanism. When the lid 630 is coupled to the bottle 620, the outer lip 107 and rim 105 of the container 100 remain seated on the shoulder 628, and the flaps 103 and inner lip 106 are positioned above the opening 627. In one example where the discharger 633 includes a spring-loaded mechanism, schematically shown at 636 in FIG. 6, the spring-loaded mechanism deploys with enough force to push open the container 100 to discharge the contents into the blending chamber 622 when the lid 630 is coupled to the bottle 620. In an alternative example, a fixed discharger applies pressure to the closed end 109 to discharge the nutrient content, where sufficient pressure is applied to the closed end 109 after a certain number of rotations of the lid 630. The discharger 633 presses the closed end 109 towards the bottle 620, while the shoulder 628 presses against the outer lip 107 and the rim 105. As the closed end 109 moves towards the bottle 620, the lip hinge 108 allows the outer lip 107 and the rim 105 to collapse or move back towards the closed end 109. As a result, the inner lip 106 presses against the flaps 103, which then rotate on their respective flap hinges 104 open and away from the nutrient receptacle 101. With the flaps 103 open, the contents are expelled from the container 100 and into the bottle 620 through the opening 627 when the blender 600 is in an upright position via gravity and/or the force from the deployment of the discharger 633. For fixed dischargers, the contents exit the container 100 because of gravity when the blender 600 is in an upright position.

The lid 630 can be coupled to the bottle 620 by pressing the lid 630 onto the bottle 620 so that the discharger 633 engages the container 100 and discharges the nutrient content. In an alternative configuration, the lid 630 can be coupled to the bottle 620 by rotating the lid 630 with respect to the bottle 620 to engage the coupling components 629 and 632 so that the discharger 633 engages the container 100 and discharges the nutrient content. In another alternative configuration, the lid 630 can be coupled to the bottle 620 by rotating the lid 630 with respect to the bottle 620 to engage the coupling components 629 and 632, and then pressing the lid 630 and the bottle 620 together to engage the discharger 633 and discharge the nutrient content. The rotation can be any suitable number of rotations or a partial rotation such that the lid 630 can be removable coupled to the bottle, such as half a rotation, a full rotation, two rotations, etc.

In other examples, the lid 630 can be coupled to the bottle 620, e.g., via rotation, enough to keep fluid from leaking from the blender 600, but not discharge the contents of the container 100. After the rotation to prevent leaking, the lid 630 could either be pressed down, further rotated, or both, to cause the contents to be discharged from the container 100.

At step 1005, the blender 600 reads identification information from the container 100. While this step is shown as being after the lid 630 is coupled to the bottle 620 and before the blending assembly 624 is actuated, the identification information can be read at any point. For example, the identification information can be read when the container is positioned on the bottle or in the lid, or after the blending assembly 624 has been actuated. The battery 654 of the blender 600 must be sufficiently charged prior to operation of the identification information reader. In other examples, this step is skipped and there is no reading of identification information.

At step 1006, the blending assembly 624 is actuated to blend the contents with the fluid. In one example, either pressing or further pressing the lid 630 towards the bottle 620 actuates the blending assembly 624. In another example, rotating or further rotating the lid 630 with respect to the bottle 620 actuates the blending assembly 624. Any combination of rotation and pressing can be employed to discharge the nutrients from the container 100 and actuate the blending assembly 624. The blending assembly 624 can be actuated when sensors on the lid 630 and bottle 620 align to indicated that the contents have been discharged and the consumer is ready to blend the smoothie, or when an internal button is pressed (e.g., when the lid 630 rotated or pressed onto the bottle 620). In another example, the blending assembly 624 can be actuated by an external action, such as pressing a button, moving the blender 600 (which could be detected, e.g., via an accelerometer), or waving a hand or other object over a camera or other sensor. In an example, the blending assembly 624 will not actuate unless the blender 600 is in a substantially upright position. The battery 654 must be sufficiently charged prior to operation of the blending assembly 624.

The blending process may take a number of forms. The blending process may be fixed, such as a single rotational speed and a single torque for a specific period of time. Alternatively, speed, torque and/or time may be varied during the blending process. Variation in the speed, torque, and/or time may be varied based upon the particular container contents and/or consumer preferences. In other examples, the blending process can be varied based on temperature of the content, bottle, container and/or outside air, humidity, and/or air pressure (e.g., either measured by a sensor on the blender 600 or input by the consumer).

The blend cycle performed by the blending assembly 624 can be based on a pre-determined RPM and duration. This information may be hard-coded into firmware or maintained in a local config file or in an database. For example, default blend cycles can be used, or new blend cycles can be downloaded. Alternatively, this information may be contained in identification information stored on the container 100, and may be varied based on the contents of the container 100. In another alternative, various blend cycles can be stored on the blender 600, and a particular blend cycle can be implemented based on identification of the particular container 100. The blend cycle may be based on a consumer-defined preference, where the consumer can set a desired RPM and duration for particular containers 100. These settings can be received by the blender 600 and written to the local storage.

At step 1007, the lid 630 is removed from the bottle 620 so that the smoothie can be removed from the bottle 630. The consumer can either consume the smoothie directly from the bottle 620 or pour the smoothie into another container. The empty container 100 can be removed from either the lid 630 or the bottle 620, and then discarded or recycled.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A blender for blending ingredients from a container with a fluid, the container having a receptacle cup with a closed end and a receptacle opening opposite the closed end and surrounded by a lip, a cover being affixed to the lip across the receptacle opening to enclose the ingredients therein, the container having a height from the closed end to the lip, the blender comprising:
   a bottle comprising:
      a chamber comprising an opening to receive the fluid, and
      a shoulder about the opening;
   a lid configured to couple with the bottle, the lid comprising a container receiver, wherein the container receiver is configured to receive the container containing the ingredients closed end first and position the receptacle opening with the cover against the shoulder when the lid is coupled to the bottle, wherein the shoulder is configured to have a shape and size to receive and seat the receptacle opening with the cover, and wherein the container receiver has an inner discharger surface that is configured to contact and apply pressure to the closed end of the container while the shoulder holds the lip stationary and wherein the lid is coupled to the bottle such that the discharger surface can advance closer to the shoulder to a distance less than the height of the container so as to displace the closed end relative to the lip to thereby open the cover and permit discharge of the ingredients from the container into the chamber.

2. The blender of claim 1 further comprising a blending assembly.

3. The blender of claim 2, wherein the blender further comprises an identification information reader to read container identification information from the container.

4. The blender of claim 3, wherein the blending assembly operates based on the identification information.

5. The blender of claim 3, wherein a speed of operation of the blending assembly is based on the identification information.

6. The blender of claim 3, wherein a duration of operation of the blending assembly is based on the identification information.

7. The blender of claim 3, wherein the identification information reader is a barcode reader.

8. The blender of claim 2, wherein coupling the lid to the bottle actuates the blending assembly.

9. The blender of claim 2 further comprising a fluid level sensor, wherein the blending assembly operates based on information from the fluid level sensor.

10. The blender of claim 2 further comprising a wireless communication device, wherein the blending assembly operates based on information from received by the wireless communication device.

11. The blender of claim 2, wherein the blending assembly operates based on the ingredients.

12. The blender of claim 2 further comprising an orientation sensor, wherein the blender assembly operates based on information from the orientation sensor.

13. The blender of claim 1 further comprising a battery in the lid.

14. The blender of claim 13, wherein the battery is electrically coupled to a blending assembly in the bottle.

15. The blender of claim 13, wherein the battery is electrically coupled to a blending assembly in the bottle when the lid is coupled to the bottle in one orientation relative to the bottle and not electrically coupled to the blending assembly when the lid is coupled to the bottle in another orientation relative to the bottle.

16. The blender of claim 1, wherein the container receiver is configured to retain the container when the lid is inverted for coupling to the bottle.

17. The blender of claim 16, wherein the container receiver is configured to retain the container via a friction fit.

18. The blender of claim 1, wherein the lid is configured to couple to the bottle to prevent fluid leakage without discharging the ingredients in one orientation relative to the bottle and to discharge the ingredients in another orientation relative to the bottle.

19. The blender of claim 1 further comprising a transceiver to communicate information about the blender and the container.

20. The blender system of claim 1, wherein the discharger surface comprises an inner fixed surface of the lid that contacts and applies pressure to the closed end of the container when the lid is coupled to the bottle.

21. The blender system of claim 1, wherein the discharger surface comprises a spring mechanism that deploys to contact and apply pressure to the closed end of the container when the lid is coupled to the bottle.

* * * * *